(12) United States Patent
Steenhoek et al.

(10) Patent No.: US 11,397,111 B2
(45) Date of Patent: Jul. 26, 2022

(54) DEVICE AND METHOD FOR DETERMINING OBSERVATION GEOMETRY

(71) Applicant: AXALTA COATING SYSTEMS IP CO., LLC, Wilmington, DE (US)

(72) Inventors: Larry E. Steenhoek, Wilmington, DE (US); Robert V. Canning, Jr., Bear, DE (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 314 days.

(21) Appl. No.: 16/555,854

(22) Filed: Aug. 29, 2019

(65) Prior Publication Data

US 2020/0088581 A1    Mar. 19, 2020

Related U.S. Application Data

(60) Provisional application No. 62/732,829, filed on Sep. 18, 2018.

(51) Int. Cl.
| | |
|---|---|
| *G01J 3/50* | (2006.01) |
| *G06T 7/90* | (2017.01) |
| *G06F 3/03* | (2006.01) |
| *G06V 10/141* | (2022.01) |
| *G01J 3/46* | (2006.01) |

(52) U.S. Cl.
CPC ............ *G01J 3/504* (2013.01); *G06F 3/0304* (2013.01); *G06T 7/90* (2017.01); *G06V 10/141* (2022.01); *G01J 2003/466* (2013.01)

(58) Field of Classification Search
CPC .............................. G06T 7/90; G06K 9/2027
See application file for complete search history.

(56) References Cited

U.S. PATENT DOCUMENTS

| | | | | |
|---|---|---|---|---|
| 5,331,169 | A  * | 7/1994 | Tanaka ................... | G01N 21/88 250/358.1 |
| 9,734,635 | B1 * | 8/2017 | Gorumkonda ..... | H04N 5/23229 |
| 2008/0158239 | A1 | 7/2008 | Lamy et al. | |

FOREIGN PATENT DOCUMENTS

JP        2012128713 A       7/2012

* cited by examiner

*Primary Examiner* — Edward Park
(74) *Attorney, Agent, or Firm* — Lorenz & Kopf LLP (57) ABSTRACT

Systems and methods for determining illumination angle and viewing angle in color observation are described. The system includes an optical capturing device to acquire an image of its surroundings and a processing unit. When operated, the processing unit executes the following steps: identify a position of a light source in the image acquired by the optical capturing device; identify a position of a viewer in the image acquired by the optical capturing device; determine a first angular position of the light source with respect to the optical capturing device and a second angular position of the viewer with respect to the optical capturing device and provide the first angular position and the second angular position to define an actual viewing geometry.

17 Claims, 6 Drawing Sheets

DEVICE AND METHOD FOR DETERMINING OBSERVATION GEOMETRY

CROSS-REFERENCE TO RELATED APPLICATION

This application claims the benefit of U.S. Provisional Application No. 62/732,829, filed Sep. 18, 2018, which is hereby incorporated in its entirety by reference.

TECHNICAL FIELD

The description generally relates to visual color harmony evaluation of repaired articles or OEM vehicles at the end of the assembly line. Particularly, the description is directed to systems and methods for determining illumination angle and viewing angle in color observation.

BACKGROUND

Surface coatings such as monocoat, clearcoat/colorcoat, and tricoat are favored for the protection and decoration of substrates such as vehicle bodies. The surface coatings can utilize one or more pigments or effect pigments to impart the desired color or appearance, such as solid, metallic, pearlescent effect, gloss, or distinctness of image, to the vehicle bodies. Metallic flakes, such as aluminum flakes are commonly used to produce coatings having flake appearances such as texture, sparkle, glint and glitter as well as the enhancement of depth perception in the coatings imparted by the flakes.

Repair of such coatings that have been damaged, e.g., in a collision or stone chipping or scratches, may be difficult in that a vehicle repair body shop or a refinisher may have to go to great lengths to repeatedly try out and to locate a best aftermarket refinish coating composition that matches the color and appearance of the vehicle's original coating, also known as original equipment manufacturing (OEM) coating. While each coating composition used in a vehicle's original coating is manufactured to a given color standard, so that, in theory, all vehicles painted with a given coating composition should appear the same color and appearance, due to a host of different variables, such as changing atmospheric conditions and use of different application techniques, the appearance of a given coating composition may actually vary from plant to plant and over different times of any year. Consequently, vehicles manufactured at one plant may appear a different color than vehicles painted with the same coating composition at another plant. A number of refinish matching coating compositions must therefore be developed for each OEM coating composition. Other color harmony issues may arise when parts made of different materials are refinished. For example, bolt-on parts such as bumper covers and mirror housings are made of plastic and are often painted at the supplier. Color harmony issues may arise from these bolt-on parts being made of plastic while the chassis of a car is substantially made of metal.

Various color matching techniques have been developed in the past to aid the selection of the correct matching coating composition to refinish a vehicle, but at least some may suffer from certain significant limitations. For instance, visual tools such as refinish color chips have been used on many occasions to find a suitable match for the vehicle that needs refinishing.

However, even extensive color matching techniques utilized prior to applying a color in accordance to a selected repair formula may not result in a perfect match. In order to identify if the applied color matches the existing color of an article, visual color harmony evaluation techniques may be utilized after refinishing.

As such, there may be a need for an approach that determines and provides the effective viewing and illumination angles so that a visual impression can be compared against instrumental measurement. In addition, other desirable features and characteristics will become apparent from the subsequent summary and detailed description, and the appended claims, taken in conjunction with the accompanying drawings and this background.

SUMMARY

Various non-limiting embodiments of a system for determining illumination angle and viewing angle, and various non-limiting embodiments of methods for the same, are disclosed herein.

In one non-limiting embodiment, the system for determining illumination angle and viewing angle in color observation includes, but is not limited to, an optical capturing device configured to acquire an image of its surroundings; a processing unit connected to the optical capturing device by a data transmission link and configured to: identify a position of a light source in the image acquired by the optical capturing device; identify a position of a viewer in the image acquired by the optical capturing device; determine a first angular position of the light source with respect to the optical capturing device and a second angular position of the viewer with respect to the optical capturing device and provide the first angular position and the second angular position to define an actual viewing geometry.

In another non-limiting embodiment, the method for determining illumination angle and viewing angle in color observation includes, but is not limited to, positioning an optical capturing device at an area to be audited; acquiring an image by the optical capturing device of its surroundings; identifying a position of a light source in the image acquired by the optical capturing device; identifying a position of a viewer in the image acquired by the optical capturing device; determining a first angular position of the light source with respect to the optical capturing device and a second angular position of the viewer with respect to the optical capturing device and providing the first angular position and the second angular position to define an actual viewing geometry.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

The following detailed description is merely exemplary in nature and is not intended to limit this disclosure or the application and uses of this disclosure. Furthermore, there is no intention to be bound by any theory presented in the preceding background or the following detailed description. It should be understood that throughout the drawings, corresponding reference numerals indicate like or corresponding parts and features.

The features and advantages identified in the present disclosure will be more readily understood, by those of ordinary skill in the art, from reading the following detailed description. It is to be appreciated that certain features, which are, for clarity, described above and below in the context of separate embodiments, may also be provided in combination in a single embodiment. Conversely, various features that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this disclosure, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

Techniques and technologies may be described herein in terms of functional and/or logical block components and with reference to symbolic representations of operations, processing tasks, and functions that may be performed by various computing components or devices, such as the processing unit of the system described herein. Such operations, tasks, and functions are sometimes referred to as being computer-executed, computerized, software-implemented, or computer-implemented. In practice, one or more processor devices (like the processing units referred to herein) can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, touchscreen displays, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

As used herein, the term "module" or "unit", especially the processing unit, refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

As used herein, the term "pigment" or "pigments" refers to a colorant or colorants that produce color or colors. A pigment can be from natural or synthetic sources and can be made of organic or inorganic constituents. Pigments can also include metallic particles or flakes with specific or mixed shapes and dimensions. A pigment is usually not soluble in a coating composition.

The term "effect pigment" or "effect pigments" refers to pigments that produce special effects in a coating. Examples of effect pigments include, but not limited to, light scattering pigments, light interference pigments, and light reflecting pigments. Metallic flakes, such as aluminum flakes, and pearlescent pigments, such as mica-based pigments, are examples of effect pigments.

The term "appearance" can include: (1) the aspect of visual experience by which a coating is viewed or recognized; and (2) perception in which the spectral and geometric aspects of a coating is integrated with its illuminating and viewing environment. In general, appearance includes texture, coarseness, sparkle, or other visual effects of a coating, especially when viewed from varying viewing angles and/or with varying illumination conditions. Appearance characteristics or appearance data can include, but not limited to, descriptions or measurement data on texture, metallic effect, pearlescent effect, gloss, distinctness of image, flake appearances and sizes such as texture, coarseness, sparkle, glint and glitter as well as the enhancement of depth perception in the coatings imparted by the flakes, especially produced by metallic flakes, such as aluminum flakes. Appearance characteristics can be obtained by visual inspection or by using an appearance measurement device.

The term "color data" or "color characteristics" of a coating can comprise measured color data including spectral reflectance values, X, Y, Z values, L, a, b values, L*,a*,b* values, L, C, h values, or a combination thereof. Color data can further comprise a color code of a vehicle, a color name or description, or a combination thereof. Color data can even further comprise visual aspects of color of the coating, chroma, hue, lightness or darkness. The color data can be obtained by visual inspection, or by using a color measurement device such as a colorimeter, a spectrophotometer, or a goniospectrophotometer. In particular, spectrophotometers obtain color data by determining the wavelength of light reflected by a coating layer. The color data can also comprise descriptive data, such as a name of a color, a color code of a vehicle; a binary, textural or encrypted data file containing descriptive data for one or more colors; a measurement data file, such as those generated by a color measuring device; or an export/import data file generated by a computing device or a color measuring device. Color data can also be generated by an appearance measuring device or a color-appearance dual measuring device.

The term "coating" or "coating composition" can include any coating compositions known to those skilled in the art and can include a two-pack coating composition, also known as "2K coating composition"; a one-pack or 1K coating composition; a coating composition having a crosslinkable component and a crosslinking component; a radiation curable coating composition, such as a UV curable coating composition or an E-beam curable coating composition; a mono-cure coating composition; a dual-cure coating composition; a lacquer coating composition; a waterborne coating composition or aqueous coating composition; a solvent borne coating composition; or any other coating compositions known to those skilled in the art. The coating composition can be formulated as a primer, a basecoat, or a color coat composition by incorporating desired pigments or effect pigments. The coating composition can also be formulated as a clearcoat composition.

The term "vehicle", "automotive", "automobile" or "automotive vehicle" can include an automobile, such as car, bus, truck, semi-truck, pickup truck, SUV (Sports Utility Vehicle); tractor; motorcycle; trailer; ATV (all-terrain vehicle); heavy duty mover, such as, bulldozer, mobile crane and earth mover; airplanes; boats; ships; and other modes of transport.

The term "formula," "matching formula," or "matching formulation" for a coating composition refers to a collection of information or instruction, based upon that, the coating composition can be prepared. In one example, a matching formula includes a list of names and quantities of pigments, effect pigments, and other components of a coating composition. In another example, a matching formula includes instructions on how to mix multiple components of a coating composition.

The term "gonioapparent paint materials" relates to such paint materials that are known to exhibit changes in color and appearance with changes in illumination and viewing geometries. This phenomenon is the root of the term gonioapparent and is defined in ASTM E284, Standard Terminology of Appearance as pertaining to change in appearance with change in illumination or viewing angle. In order to characterize the color and spatial appearance of gonioapparent materials it is necessary to measure their color at a variety of different measurement geometries. Further international standards on color measurement of gonioapparent materials are defined in ASTM E2194 (Standard Practice for Multiangle Color Measurement of Metal Flake Pigmented Materials), ASTM E2539 (Standard Practice for Multiangle Color Measurement of Interference Pigments), and DIN 6175-2 (Colour Tolerances for Automotive Paints, Part 2: Effect Finishes).

Although vehicle and vehicle coating are specifically described in some examples, this disclosure can also be used for visual color harmony evaluation of other articles, especially of articles with gonioapparent paint materials of which the appearance depends on the illumination angle and viewing angle. Some examples of such coated articles include, but not limited to: home appliances, such as refrigerator, washing machine, dishwasher, microwave ovens, cooking and baking ovens; electronic appliances, such as television sets, computers, electronic game sets, audio and video equipment; recreational equipment, such as bicycles, ski equipment, all-terrain vehicles; and home or office furniture, such as tables, file cabinets. Examples of articles without coating that have color and appearance include, but not limited to, engineering polymers, injection molding plastics or polymers, or other synthetic materials.

Figure 1:
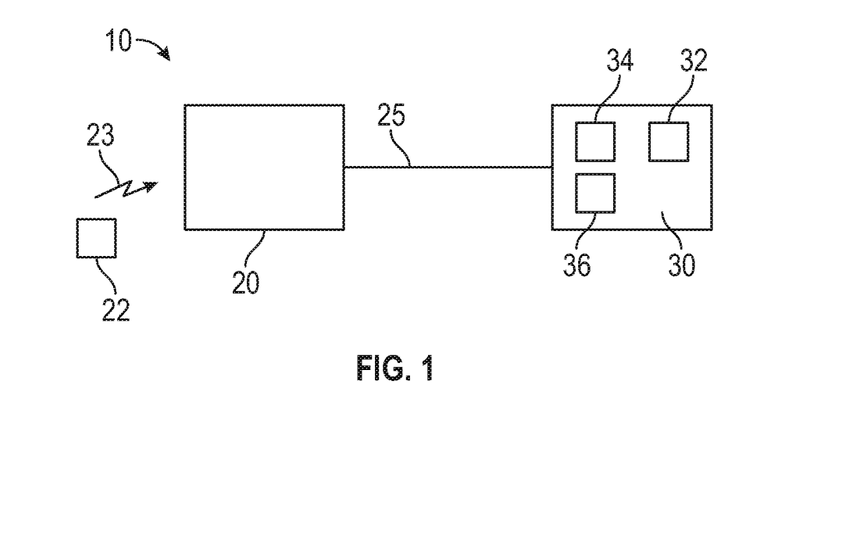
FIG. 1 is a schematic representation of a system in accordance with several embodiments.

FIG. 1 shows a system 10 for determining illumination angle and viewing angle in color observation. The system 10 comprises an optical capturing device 20 configured to acquire an image of its surroundings. Furthermore, the system 10 comprises a processing unit 30 connected to the optical capturing device 20 by a data transmission link 25. The processing unit 30 comprises a processor 36, a display 32, and an input device 34. The display 32 is configured to display optical information to an operator. The input device 34 is configured to receive input data from the operator. The processor 36 is configured to identify a position of a light source in the image acquired by the optical capturing device 20, identify a position of a viewer in the image acquired by the optical capturing device, determine a first angular position of the light source with respect to the optical capturing device and a second angular position of the viewer with respect to the optical capturing device and provide the first angular position and the second angular position to define an actual viewing geometry.

The input device 34 can be selected from a digital input device, such as a wired keyboard, a wireless keyboard, a digital writing pad, a touch screen, an input portal that can be connected to an electrical device or another computer, or any other digital devices that can input data into the computing device; an optical input device, such as a barcode reader, a scanner, a digital camera, a digital video camera, or any other optical devices that can input data into the computing device; an electromagnetic input device, such as a radio receiver, an RFID (radio frequency identification) receiver, an infrared data receiver, or any other devices that can receive data through a broad range of electromagnetic wavelengths; or a combination thereof. Each of the data input devices may further require necessary adaptors or couplings in order to input data into the processor 36 or processing unit 30, wherein those adaptors or couplings can be readily determined by those skilled in the art. Those adaptors or couplings can further be wired or wireless.

The display 32 can be selected from a digital display device, such as a computer monitor, a PDA, a computer, a cell phone, a smart phone, a tablet computer, or a TV; an optical display device, such as a projector; a print display, such as a printer; or a combination thereof. The display device can also be a dual functional display/data input device. One example of such dual functional device is a touch screen of a computer, a smart phone, a tablet computer, or a PDA.

The optical capturing device 20 can be a camera, preferably for taking still images. The camera may operate in the visual range of light but may also work in the infrared range at a wavelength between 1 mm and 780 nm.

The camera comprises camera optics and components to take an image. Preferably, the camera is a digital camera. The camera may comprise an optical sensor like a CCD-sensor (charge coupled device). Furthermore, the camera comprises a memory unit to store the acquired images. The camera transmits the image data to the processing unit 30 via the data transmission link 25.

The data transmission link 25 may be wired or wireless and may be designed as a unidirectional or bidirectional link. For example, the processing unit 30 may transmit commands to the camera via the data transmission link 25.

The system 10 further comprises a remote control 22 that is communicatively connected to the camera via a control link 23. The control link 23 may be a wired or wireless link. Via the remote control 22, the camera 20 may be triggered to acquire a picture. For example, the operator may change the viewing position and carry the remote control. A still image may then be taken whenever it is desired by pushing a button of the remote control 22. This provides a lot of flexibility for using the system 10 described herein. For example, when a color mismatch is detected, the operator may take a picture from that point where the mismatch is seen. The system then determines the viewing geometry (illumination angle, viewing angle) so that the conditions when the mismatch is detectable are determined.

In one embodiment, the system 10 for determining illumination angle and viewing angle in color observation comprises an optical capturing device 20 configured to acquire an image of its surroundings; a processing unit 30 connected to the optical capturing device 20 by a data transmission link 25, wherein the processing unit 30 is configured to identify a position of a light source in the image acquired by the optical capturing device; identify a position of a viewer in the image acquired by the optical capturing device; determine a first angular position of the light source with respect to the optical capturing device and a second angular position of the viewer with respect to the optical capturing device and provide the first angular position and the second angular position to define an actual viewing geometry. The viewer may be a person or an automated detecting unit that is positioned at a certain position with respect to the article and detects the optical appearance of the article. The detecting unit may capture an image of the article and may transmit it to a second display unit so that an operator is allowed to verify the optical impression of the article from the position of the detecting unit.

In other words, in this embodiment, an image is acquired from the perspective of an audited area of an article so that any light source or light sources as well as a viewer can be identified to determine the position of the light source (or light sources) and the viewer in order to determine the specific lighting and viewing conditions. Especially, the angular positions of the light source and the viewer are determined based on the acquired image. This provides information about the conditions under which the color appearance may undergo further verification. For example, the system may take an image in case the viewer finds that there is a mismatch between the color of the audited area and the surroundings of the audited area. In that case, the viewer may trigger the optical capturing device to take a picture.

In some embodiments, the optical capturing device 20 may be removably attached to the area to be audited, e.g., surface of a vehicle. For example, the optical capturing device 20 may comprise one or more manually removable vacuum cups or magnets to attach the device 20 to the surface to be audited or close to the surface to be audited. Particularly, the optical capturing device may be attached to the surface to be audited such that a normal to the surface to be audited is parallel or coincides with a normal to the optics of the optical capturing device. In other words, when positioning the optical capturing device at an area to be audited, it should be noted that the optical axis of optical capturing device preferably coincided with the surface normal of the area being audited Thus, a relative angle of the light source with respect to the surface to be audited corresponds to the relative angle of the light source with respect to the optics (in particular the lens) of the optical capturing device.

In particular, the viewing geometry is defined by the relative position of the light source and viewer with respect to the area to be audited, i.e., with respect to the optical capturing device.

In some embodiments, the optical capturing device 20 is a camera configured to acquire an image with a field of view of 180° or less. For example, the camera may have a field of view of 165° which may be sufficient to acquire the positions of the light source and the viewer under the typical viewing conditions. For example, the camera may be equipped with a so-called fisheye-lens in its optics.

In some embodiments, the optical capturing device 20 is configured to acquire a high dynamic range (HDR) image.

Bright light sources may saturate the signal of standard dynamic range images. This saturation area can be quite large, making it difficult to pinpoint the center of the light source in the image. HDR images on the other hand are much less prone to image saturation than are standard dynamic range images and therefore it is easier to properly select the center of the light source.

In some embodiments, the processing unit 30 is configured to determine a first polar angle of the light source in the acquired image.

A polar angle defines the position of an object on a sphere that is defined by the field of view of the optical capturing device. The polar angle is further described with reference to FIGS. 4 to 6.

The polar angle of the light source particularly defines the viewing geometry because it describes the relative position of the light source and the optical capturing device which is attached to the area to be audited.

In some embodiments, the processing unit is configured to determine a first azimuth angle of the light source in the acquired image.

In addition to the polar angle, the azimuth angle is used to further define the relative position of the light source with respect to the optical capturing device.

In some embodiments, the processing unit is configured to determine a second polar angle of the viewer in the acquired image.

In some embodiments, the processing unit is configured to determine a second azimuth angle of the viewer in the acquired image.

The second polar angle and the second azimuth angle define the position of the viewer in the acquired image.

In some embodiments, the system further comprises a remote control configured to trigger acquiring the image by the optical capturing device.

Thus, the viewer can take an image when he or she is at a specific position. The viewer may change their position and audit the vehicle while the viewer can take an image (one or more images) by using the remote control whenever desired.

In some embodiments, the remote control is portable so that the viewer can carry it when changing a viewing position. The remote control is connected to the optical capturing device by a control link.

In some embodiments, the system further comprises a display configured to display the acquired images and/or the first angular position and/or the second angular position.

For example, the processing unit is a computer or laptop or a portable device like a smartphone or a tablet having a monitor/display so that the acquired image can be displayed.

In some embodiments, the system further comprises an input device configured to indicate the position of the light source and/or the position of the viewer.

In case the light source and/or the viewer cannot be identified automatically by a software component of the processing device, an operator may manually indicate the position of the light source and/or viewer. For example, a pointer may be moved within the image by a mouse or by a keyboard to the light source and to the eyes of a viewer to indicate the specific positions of the light source and the viewer in the image. The positions of the light source and the viewer correspond to the position of the pointer as positioned by the operator within the image.

Alternatively, the position may be indicated by touching a specific position in the image on a touchscreen.

Figure 2:
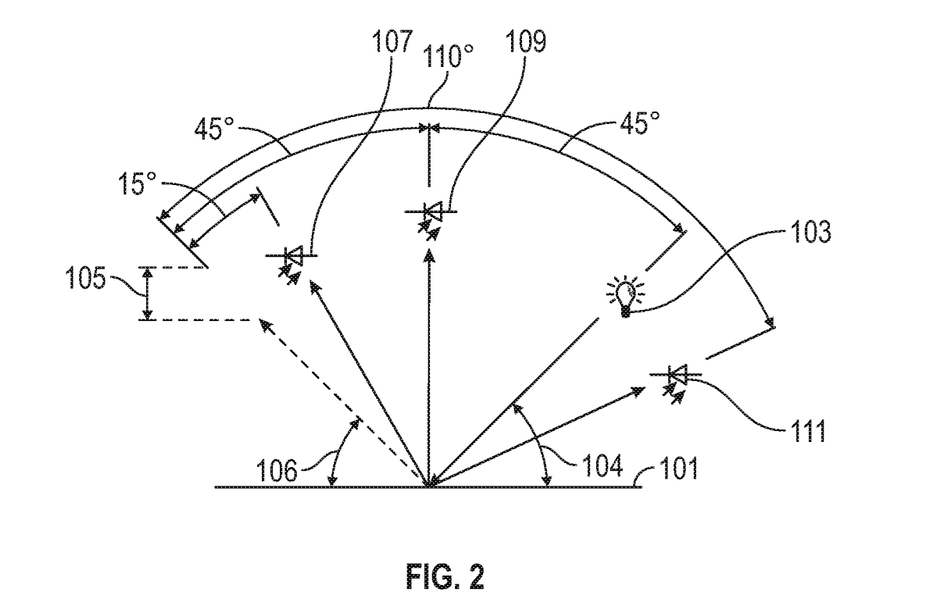
FIG. 2 is an exemplary representation of measurement geometries.

FIG. 2 exemplarily shows a typical measurement geometry. The area to be audited is generally shown at 101 and may be a coated surface or part of a surface of a vehicle. Rays of light are reflected by the surface 101 and may influence the optical appearance of the surface 101. Light source 103, for example the sun or an artificial light source with a defined spectrum of light, emit light rays towards the surface 101. The specular reflection of the light rays is shown at 105 with the angle of incidence 104 of the light rays of light source corresponding to the angle of reflection 106 of the specular reflection.

Three detectors 107, 109, 111 are arranged at defined positions: the first detector 107 is arranged at 15° from specular reflection, the second detector 109 is arranged at 45° from specular reflection, and the third detector 111 is arranged at 110° from specular reflection. The angular position of the detectors is provided in a direction from the specular reflection towards the light source.

The detectors 107, 109, 111 may be an appearance measurement device as described above.

Figure 3:
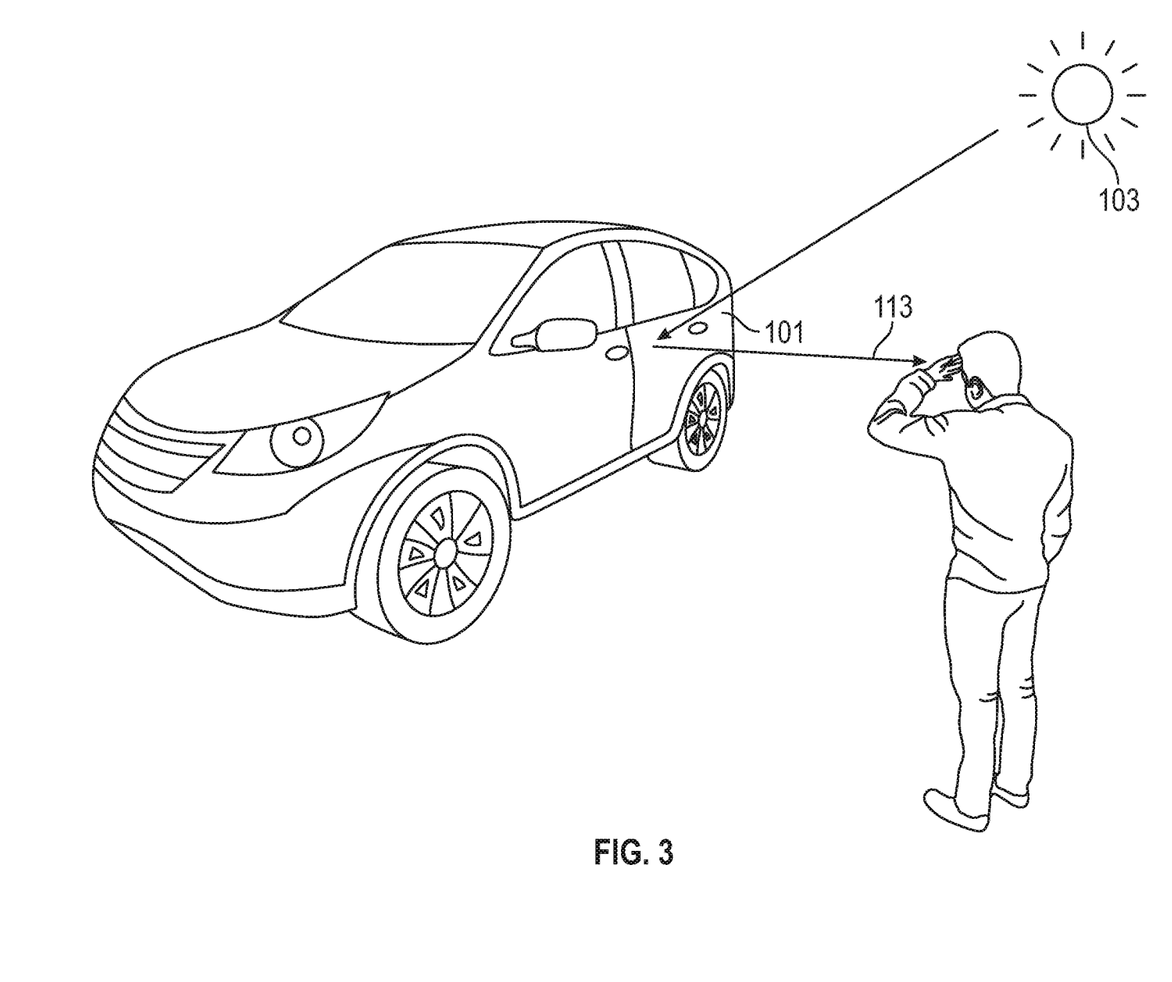
FIG. 3 exemplarily shows a scenario of a color and appearance harmony audit.

FIG. 3 shows an exemplary situation where a surface 101 to be audited is observed by a viewer 113 under specific lighting conditions defined by the position of the sun 103. If, under this condition, the viewer 113 observes a mismatch of repaired sections of the surface of the car and the surroundings of these repaired sections, it does not necessarily mean that the mismatch can also be observed under different lighting and viewing conditions. It is necessary to determine the specific viewing geometry (position of the light source and the viewer with respect to the audited surface) in order to determine the cause of the mismatch.

Figure 4:
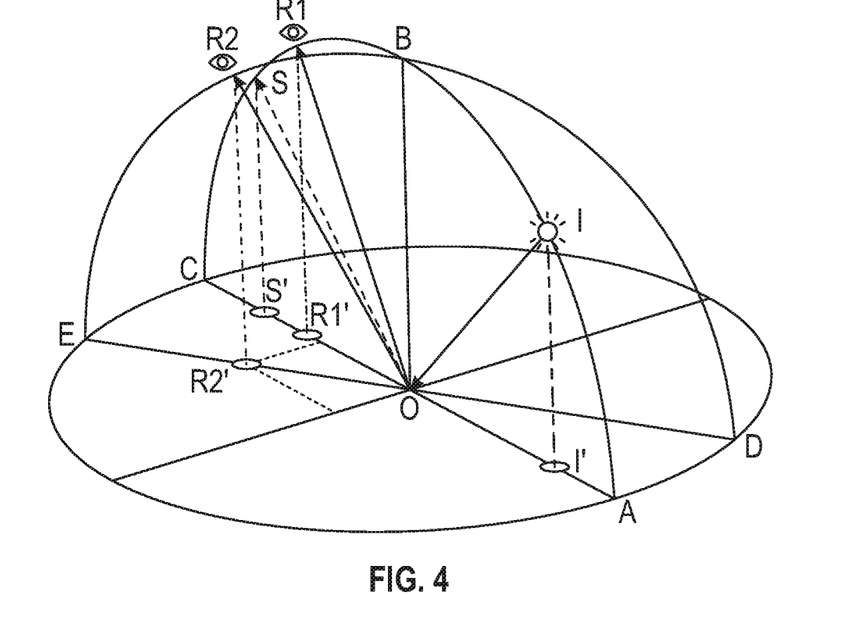
FIG. 4 exemplarily shows in-plane and out-of-plane viewing geometries.

FIG. 4 shows in-plane and out-of-plane geometries. "O" defines the point of origin of the coordinate system and particularly corresponds to the position of the optical capturing device. The optical capturing device captures a hemispherical image with a given field of view. In FIG. 4, the field of view is 180° as shown by the circle (base area) defined by the points "A", "D", "C", and "E". However, the field of view may be smaller than 180°. The illumination ray "IO" and the sample normal "BO" define the specular plane "ABC". Viewing ray "OR1" lies in the specular plane. The specular reflection "OS" also lies in the specular plane. "S'", "R1'", and "I'" are the projections of "S", "R1", and "I", respectively, onto the base area.

Viewing ray "OR2" lies out of the specular plane in the plane "DBE".

The polar angle of "R1" corresponds to the angle between the base area and "OR1". The polar angle can be determined by determining the position of the projection "R1'" in the base area. Thus, the polar angle can be determined in the image taken by the optical capturing device. The azimuth angle of "R2" is the angle between "AC" and "DE".

Figure 5:
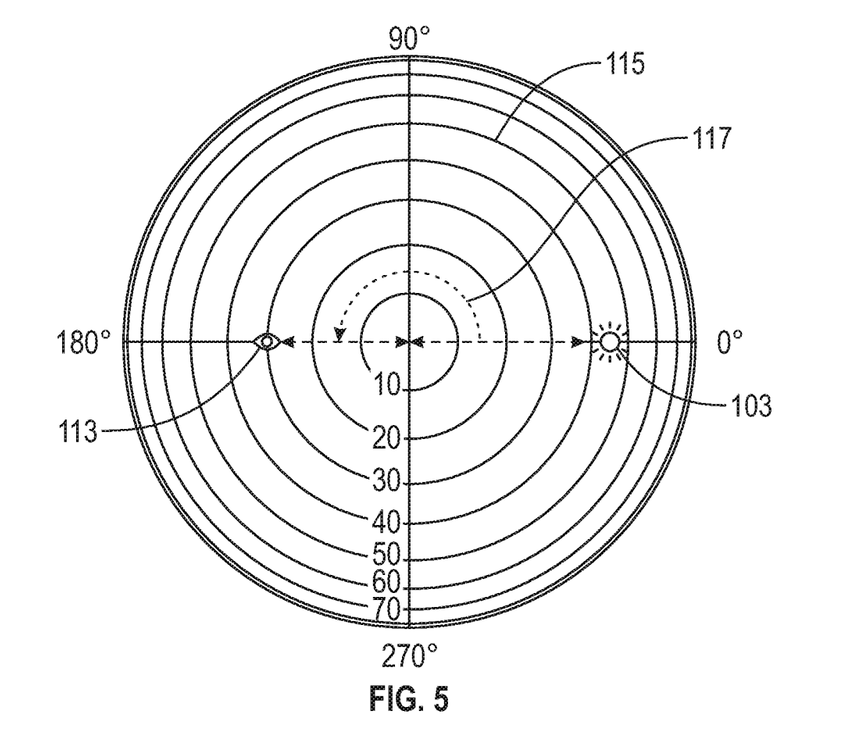
FIG. 5 shows an alternate view of the in-plane geometry of FIG. 4.

FIG. 5 schematically shows an image taken by the optical capturing device. In this image, the light source 103 is positioned on the right of the horizontal axis and the viewing point is on the left. The polar angle of the light source is at about 45°, see polar angle lines 115 from 10 to 70°, where 80° corresponds to the outermost circle and 90° corresponds to the circumferential border of the schematic image. The azimuth angle is shown at 117. In FIG. 5, the azimuth angle of the light source is 0° and the azimuth angle of the viewer is 180°. The polar angle of the viewer is 30°. FIG. 5 basically corresponds to the "BOR1"-scenario shown in FIG. 4.

Figure 6:
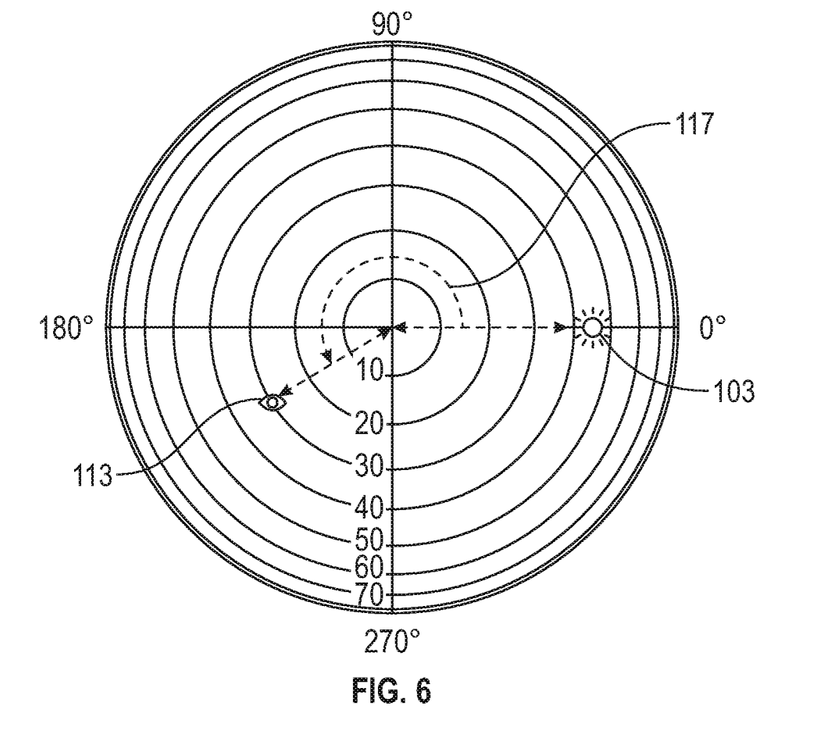
FIG. 6 shows an alternate view of the out-of-plane geometry of FIG. 4.

FIG. 6 shows an alternative image that corresponds to the "IOR2"-scenario of FIG. 4. The viewer is out of the specular plane. The position of the light source 103 did not change while the position of the viewer 113 changed.

The polar angle of the viewer is still 30° but its azimuth angle is now about 210°.

The system 10 can be calibrated by mapping spherical coordinates of imaged hemisphere onto 2D-images. Afterwards, the optical capturing device is attached (preferably removably attached) to the object to be audited with surface normal of optical capturing device coincident with surface normal of the object. An image (preferably fisheye image) of the environment is acquired from the perspective of the object surface at or close to a point of audit. The light source and viewer are identified in the 2D-image and the locations of light source and viewer are mapped to spherical coordinates. This allows calculating a position direction of specular reflection and also calculating an effective aspecular angle and flake angle of viewing geometry. This process may be repeated for each light source, if multiple light sources are involved. Intensity weighting may be required to estimate effective geometry.

In order to carry out these steps, the system may comprise a computer program product that is executed by the processing unit, especially by a processor of the processing unit, so that said steps are carried out.

International measurement standards for effect coatings such as ASTM standard E2194 or E2539 assume an in-plane measurement geometry where the central axis of the illumination rays, the central axis of the viewing or detection rays and central axis of the specular reflection of the light source by the specimen lie in the same plane. While this may be the normal case for optical systems of measurement instruments, it is not the general case when viewing a specimen in a real-word viewing setting such as a color harmony audit of an automobile. Under real-world conditions, the measurement geometry is best described by the polar angle of the surface normal of those flakes in an effect paint finish that will act as specular reflectors for the given illumination and viewing geometry.

Figure 7:
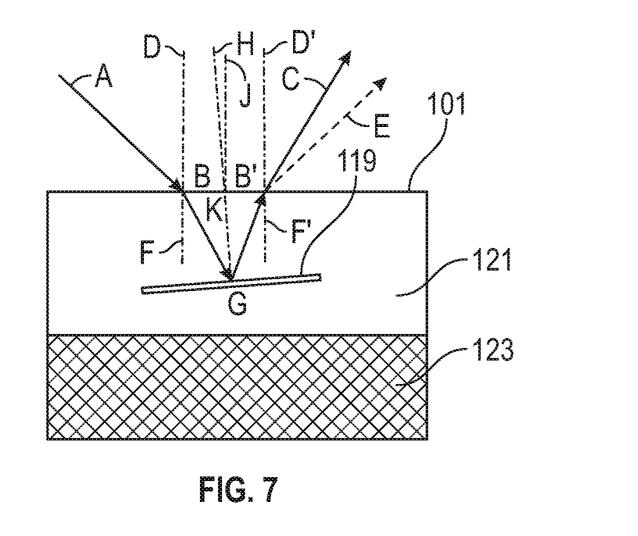
FIG. 7 schematically shows the influence of pigment flakes onto the viewing geometry.

FIG. 7 shows how the effective flake polar angle of a given geometry is derived and especially shows the specular plane for the case of illumination ray AB and viewing ray B'C. Allowing for refraction of the light as it enters and exits the paint film, only flakes that are oriented with flake normal polar angle of HKJ will act as specular reflectors. It is the proportion of flakes that lie at each polar angle that determines the flop characteristic of the specimen. The effective flake normal polar angle for a particular illumination and viewing geometry may best describe the geometry and not the aspecular angle.

Figure 8:
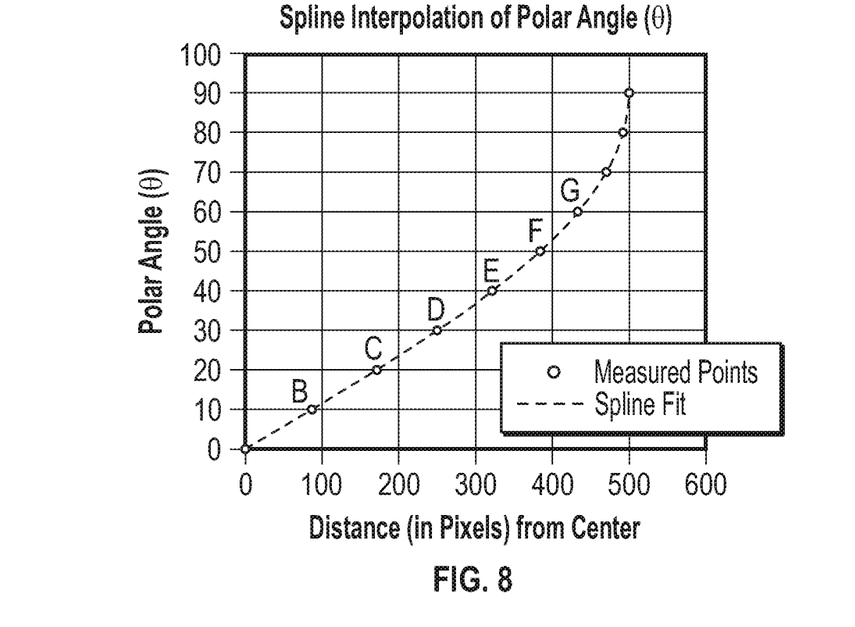
FIG. 8 schematically shows the 2D-mapping and calibration of a system in accordance with several embodiments.

FIG. 8 shows 2D mapping and calibration of the image taken by the optical capturing device. On the left, a 2D-fisheye photo of a calibration hemisphere is shown with the polar angle calibration lines. "B" corresponds to 10°, "C" to 20°, etc. On the right, spline interpolation of polar angle θ is shown. The distance in pixels from the center of the left drawing is determined and based on the number of pixels, the polar angle Θ is determined. The points B, C, D, ..., G are measured points and the dotted line is the spline interpolation.

It is noted that the number of pixels may depend on the characteristics of the optical capturing device and that the number of pixels may vary. However, this does not alter the basic concept that a given number of pixels corresponds to a specific polar angle.

The azimuth angle can be determined in a similar manner to the polar angle. The azimuth angle may be determined based on the number of pixels at a specific distance (e.g., the distance of the viewer) from the center point of the image. Particularly, the number of pixels of a full circle at the distance of the viewer (radius of this full circle) is determined and corresponds to 360°. Then the number of pixels between the horizontal line and the viewer along the circle line is determined and based on the ratio (pixels of full circle)/(pixels of partial circle) the azimuth angle is determined.

The 2D-mapping and the spline interpolation may be executed by a computer program product that is executed by the processing unit.

In other words, the system 10 described herein relates to a device for field use to record and determine illumination angle and viewing angle in color observation. The device can comprise an imaging system, such as a camera with a fisheye lens to record illumination lighting and observation positions. The device can further comprise a computer program to map spherical coordinates of the illumination and observation positions to record illumination angle and viewing angle. The computer program can further produce flake angles and effective/actual viewing geometry. When color match is assessed on an object, such as during a color harmony audit, it may be difficult to determine the illumination and viewing conditions that exist. If an unsatisfactory color match is observed, it may be difficult to know the underlying geometry at which the match is failing. The system and the method described herein allow determination of the underlying geometry so that it can be instrumentally duplicated to better understand the nature and specifics of the match situation.

Figure 9:
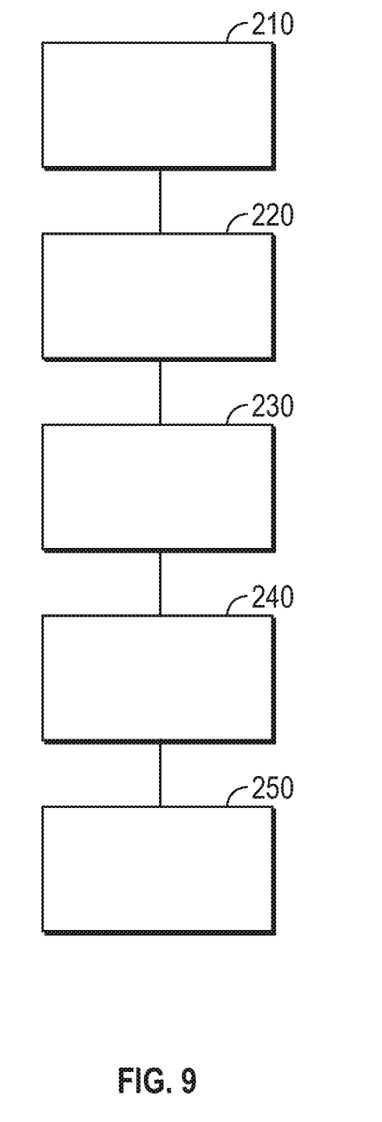
FIG. 9 schematically shows the steps of a method in accordance with an embodiment.

FIG. 9 schematically shows the steps of a method for determining illumination angle and viewing angle in color observation.

In one embodiment, the method comprises the following steps: in a first step, shown at 210, positioning an optical capturing device at an area to be audited; in a second step, shown at 220, acquiring an image by the optical capturing device of its surroundings; in a third step, shown at 230, identifying a position of a light source in the image acquired by the optical capturing device; in a fourth step, shown at 240, identifying a position of a viewer in the image acquired by the optical capturing device; and in a fifth step, shown at 250, determining a first angular position of the light source with respect to the optical capturing device and a second angular position of the viewer with respect to the optical capturing device and providing the first angular position and the second angular position to define an actual viewing geometry.

The steps of the method substantially correspond to the functions of the system described with reference to FIGS. 1 to 8. Therefore, for the sake of brevity, details are not repeated here.

Any function of the system 10, especially of the processing unit, may be implemented as a method step, and vice versa.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A system for determining illumination angle and viewing angle in color observation, the system comprising:
   an optical capturing device configured to acquire an image of its surroundings;
   a processing unit connected to the optical capturing device by a data transmission link and configured to:
   identify a position of a light source in the image acquired by the optical capturing device;
   identify a position of a viewer in the image acquired by the optical capturing device; and
   determine a first angular position of the light source with respect to the optical capturing device and a second angular position of the viewer with respect to the optical capturing device and provide the first angular position and the second angular position to define an actual viewing geometry; and
   wherein the processing unit is configured to determine a flake angle of a flake within a coating when the optical capturing device is positioned on a vehicle having the coating.

2. The system of claim 1,
wherein the optical capturing device is a camera configured to acquire the image with a field of view of 180° or less;
wherein the optical capturing device is preferably configured to acquire a high dynamic range image.

3. The system of claim 1,
wherein the viewing geometry is defined by the position of the light source relative to the position of the viewer with respect to the optical capturing device.

4. The system of claim 1, further comprising:
a remote control configured to trigger acquiring the image by the optical capturing device.

5. The system of claim 4,
wherein the remote control is portable so that the viewer can carry it when changing a viewing position; and
wherein the remote control is connected to the optical capturing device by a control link.

6. The system of claim 1, further comprising
a display configured to display the first angular position and/or the second angular position.

7. The system of claim 6, further comprising
an input device configured to indicate the position of the light source and/or the position of the viewer.

8. The method of claim 1, further comprising the step
triggering, by a remote control, an image acquiring process by the optical capturing device.

9. The method of claim 8, wherein the viewing geometry is defined by the position of the light source relative to the position of the viewer with respect to the optical capturing device.

10. A system for determining illumination angle and viewing angle in color observation, the system comprising:
an optical capturing device configured to acquire an image of its surroundings;
a processing unit connected to the optical capturing device by a data transmission link and configured to:
identify a position of a light source in the image acquired by the optical capturing device;
identify a position of a viewer in the image acquired by the optical capturing device; and
determine a first angular position of the light source with respect to the optical capturing device and a second angular position of the viewer with respect to the optical capturing device and provide the first angular position and the second angular position to define an actual viewing geometry;
wherein the processing unit is configured to determine a first polar angle of the light source in the image acquired; and
wherein the processing unit is configured to determine a first azimuth angle of the light source in the image acquired.

11. The system of claim 10,
wherein the processing unit is configured to determine a second polar angle of the viewer in the image acquired; and
wherein the processing unit is configured to determine a second azimuth angle of the viewer in the image acquired.

12. A method for determining illumination angle and viewing angle in color observation, the method comprising:
positioning an optical capturing device on a coating of a vehicle at an area to be audited;
acquiring an image by the optical capturing device of its surroundings;
identifying a position of a light source in the image acquired by the optical capturing device;
identifying a position of a viewer in the image acquired by the optical capturing device;
determining a first angular position of the light source with respect to the optical capturing device and a second angular position of the viewer with respect to the optical capturing device and providing the first angular position and the second angular position to define an actual viewing geometry; and
determining a flake angle of a flake within the coating of the vehicle.

13. The method of claim 12, further comprising the step
acquiring the image with a field of view of 180° or less
wherein the image is preferably a high dynamic range image.

14. The method of claim 12, further comprising the step
determining a first polar angle of the light source in the image acquired; and
determining a first azimuth angle of the light source in the image acquired.

15. The method of claim 12, further comprising the step
determining a second polar angle of the viewer in the image acquired; and
determining a second azimuth angle of the viewer in the image acquired.

16. The method of claim 12, further comprising the step
displaying the first angular position and/or the second angular position.

17. The method of claim 16, further comprising the step
indicating the position of the light source and/or the position of the viewer in the image displayed.

* * * * *